US010663630B2

(12) United States Patent
Larsen et al.

(10) Patent No.: US 10,663,630 B2
(45) Date of Patent: May 26, 2020

(54) 360 DEGREE PRIVACY FILM

(71) Applicant: 3M INNOVATIVE PROPERTIES COMPANY, St. Paul, MN (US)

(72) Inventors: Jeremy K. Larsen, Farmington, MN (US); Kurt J. Halverson, Lake Elmo, MN (US); Jeffrey L. Solomon, Vadnais Heights, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/316,882

(22) PCT Filed: Jun. 19, 2015

(86) PCT No.: PCT/US2015/036602
§ 371 (c)(1),
(2) Date: Dec. 7, 2016

(87) PCT Pub. No.: WO2016/003669
PCT Pub. Date: Jan. 7, 2016

(65) Prior Publication Data
US 2017/0108628 A1 Apr. 20, 2017

Related U.S. Application Data

(60) Provisional application No. 62/018,713, filed on Jun. 30, 2014.

(51) Int. Cl.
*G02B 5/22* (2006.01)
*G02B 5/00* (2006.01)
(Continued)

(52) U.S. Cl.
CPC .............. *G02B 5/003* (2013.01); *G02B 1/04* (2013.01); *G02B 5/00* (2013.01); *G02B 6/0053* (2013.01);
(Continued)

(58) Field of Classification Search
CPC .... G02B 2207/123; G02B 5/003; G02B 1/04; G02B 5/045; G02B 5/30; G02B 27/022;
(Continued)

(56) References Cited

U.S. PATENT DOCUMENTS 4,621,898 A 11/1986 Cohen
5,481,385 A * 1/1996 Zimmerman ..... G02F 1/133524
349/62
(Continued)

FOREIGN PATENT DOCUMENTS

JP 2007-272065 A 10/2007
WO WO 95/01584 A 1/1995
(Continued)

OTHER PUBLICATIONS

International Search Report for PCT International Application No. PCT/US2015/036602, dated Oct. 14, 2015, 4 pages.

*Primary Examiner* — William R Alexander
*Assistant Examiner* — Balram T Parbadia
(74) *Attorney, Agent, or Firm* — Yufeng Dong (57) ABSTRACT

Light control films are provided that confine light transmitted therethrough to be within a 360° view region and block light outside of this view region. The light control films can provide security in all directions including right-and-left and up-and-down of the films, without compromising light transmittance compared to one-dimensional light control films. The light control films include an array of light transmissive, tapered posts and absorptive regions disposed between the posts.

19 Claims, 8 Drawing Sheets

(51) Int. Cl.
  *G02B 6/08* (2006.01)
  *F21V 8/00* (2006.01)
  *G02B 1/04* (2006.01)
  *G02B 27/02* (2006.01)

(52) U.S. Cl.
  CPC .............. *G02B 6/08* (2013.01); *G02B 27/022* (2013.01); *G02B 2207/123* (2013.01)

(58) Field of Classification Search
  CPC ... G02B 5/3025; G02B 5/22; G02F 1/133509; G02F 1/133512; G02F 2001/133607
  See application file for complete search history.

(56) References Cited

U.S. PATENT DOCUMENTS

| | | | |
|---|---|---|---|
| 5,501,893 A | 3/1996 | Laermer | |
| 5,521,726 A * | 5/1996 | Zimmerman | G02B 5/3025 349/159 |
| 5,745,199 A | 4/1998 | Suzuki et al. | |
| 6,398,370 B1 | 6/2002 | Chiu | |
| 8,213,082 B2 | 7/2012 | Gaides | |
| 8,605,256 B2 | 12/2013 | DeVoe | |
| 9,063,284 B2 * | 6/2015 | Jones | G02B 27/0994 |
| 9,229,253 B2 * | 1/2016 | Schwartz | G02B 26/004 |
| 9,335,449 B2 * | 5/2016 | Gaides | G02B 5/3066 |
| 2002/0080484 A1 | 6/2002 | Moshrefzadeh et al. | |
| 2004/0095650 A1 | 5/2004 | Tracy | |
| 2005/0243428 A1 | 11/2005 | Hiromitsu et al. | |
| 2007/0160811 A1 | 7/2007 | Gaides | |
| 2008/0186558 A1 | 8/2008 | Lee | |
| 2008/0297908 A1 | 12/2008 | Adachi | |
| 2009/0213593 A1 | 8/2009 | Foley et al. | |
| 2009/0284836 A1 * | 11/2009 | Boyd | G02B 5/003 359/613 |
| 2010/0201242 A1 | 8/2010 | Liu et al. | |
| 2010/0271721 A1 * | 10/2010 | Gaides | G02B 5/045 359/885 |
| 2014/0204464 A1 * | 7/2014 | Halverson | G02F 1/133524 359/599 |

FOREIGN PATENT DOCUMENTS

| | | |
|---|---|---|
| WO | WO 9607115 | 3/1996 |
| WO | WO 2009/052052 | 4/2009 |
| WO | WO 2012-162458 | 5/2012 |

* cited by examiner

360 DEGREE PRIVACY FILM

CROSS REFERENCE TO RELATED APPLICATIONS

This application is a national stage filing under 35 U.S.C. 371 of PCT/US2015/036602, filed Jun. 19, 2015, which claims the benefit of U.S. Application No. 62/018,713, filed Jun. 30, 2014, the disclosure of which is incorporated by reference in its/their entirety herein.

TECHNICAL FIELD

The present disclosure relates to light control films and displays incorporating same.

BACKGROUND

Light control film (LCF), also known as light collimating film, is an optical film that is configured to regulate the transmission of light, often to obscure what is being viewed from others (for example, privacy film). LCFs are known and typically include a light transmissive film having a plurality of parallel grooves where the grooves are formed of a light-absorbing material. Various LCFs are described in, for example, U.S. Pat. No. 8,213,082 (Gaides et al.), U.S. Pub. No. 2008/0186558 (Lee et al.), U.S. Pat. No. 6,398,370 (Chiu et al.), etc.

LCFs can be placed proximate a display surface, an image surface, or other surfaces to be viewed. At normal incidence, (i.e. 0 degree viewing angle) where a viewer is looking at an image through the LCF in a direction that is perpendicular to the film surface, the image is viewable. As the viewing angle increases, the amount of light transmitted through the LCF decreases until a viewing cutoff angle is reached where substantially all the light is blocked by the light-absorbing material and the image is no longer viewable. This can provide privacy to a viewer by blocking observation by others that are outside a typical range of viewing angles.

LCFs can be prepared by molding and ultraviolet curing a polymerizable resin on a polycarbonate substrate. Such LCFs are commercially available under the trade designation "3M Filters for Notebook Computers and LCD Monitors" from Minnesota Mining and Manufacturing Company ("3M") of St. Paul, Minn.

Conventional parallel grooved films are one-dimensional light control or privacy films, i.e. they have a light control effect only to the right and left (or up and down) of the film. A single sheet of conventional film thus cannot meet the user's need to ensure security in all directions including right-and-left and up-and-down of the film. In order to achieve a light control effect in various directions by a conventional light control film, two films could be overlapped with their louver directions crossing each other. However, this inevitably results in the problem of increasing the film thickness and decreasing the light transmittance.

SUMMARY

Briefly, in one aspect, the present disclosure provides light control films that are capable of transmitting light, or allowing a viewer to observe information, only within a viewing region centered around the normal (perpendicular line) to a surface. The light control films can generally block information or light outside of this viewing region, and provide security in all directions including right-and-left and up-and-down of the film. The light control films described herein can be a 360 degrees privacy film that confines light transmitted from a surface thereof to be within a 360° view cone centered around the normal to the surface.

In another aspect, a light control film is provided. The light control film includes a first major surface and a second major surface opposite the first major surface. A view axis is generally perpendicular to at least one of the first and second major surfaces. An array of posts including a light transmissive material are arranged in two dimensions with columns and rows, and extend along respective longitudinal axes from the first major surface to the second major surface. Absorptive regions are disposed between the array of posts. The absorptive regions include an optically absorptive material and extend at least partially from the first major surface to the second major surface. At least one of the posts has a tapered shape along the respective longitudinal axis. The array of posts and the adsorptive regions are arranged to confine light transmitted out of the first or second major surface to be within a 360° view cone around the view axis.

In yet another aspect, a display device is provided with a light control film. The light control film includes a first major surface and a second major surface opposite the first major surface. A view axis is generally perpendicular to at least one of the first and second major surfaces. An array of posts including a light transmissive material are arranged in two dimensions with columns and rows, and extend along respective longitudinal axes from the first major surface to the second major surface. Absorptive regions are disposed between the array of posts. The absorptive regions include an optically absorptive material and extend at least partially from the first major surface to the second major surface. At least one of the posts has a tapered shape along the respective longitudinal axis. The array of posts and the adsorptive regions are arranged to confine light transmitted out of the first or second major surface to be within a 360° view cone around the view axis.

Various unexpected results and advantages are obtained in exemplary embodiments of the disclosure. One such advantage of exemplary embodiments of the present disclosure is that the light control films described herein can provide a 360 degree privacy protection, while still exhibiting a high light transmittance comparable to conventional one-dimensional light control films such as, for example, the films disclosed in U.S. Pat. No. 8,213,082 (Gaides et al).

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

The present disclosure provides light control films that are capable of transmitting light, or allowing a viewer to observe information, only within a viewing region centered around the normal (perpendicular line) to a surface. The light control films can generally block information or light outside of this viewing region, and provide security in all directions including right-and-left and up-and-down of the film. The light control films described herein can be a 360 degree privacy film that confines light transmitted from a surface thereof to be within a 360° view cone centered around the normal to the surface.

Terms such as "light transmissive", "optically transparent", or "transmitting light" means that the light is transmitted to the extent acceptable to the light transmitting portions of the conventional one-dimensional light control films such as, for example, the films disclosed in U.S. Pat. No. 8,213,082 (Gaides et al) at desired wavelengths. In some embodiments, the light transmitting portions can have a transmittance of, for example, 90% or higher, 95% or higher, or 98% or higher, in the visible light spectrum.

Terms such as "optically absorptive", "optically opaque", or "not transmitting light" means the light is absorbed and/or diffused (or dispersed) to the extent acceptable to the light absorptive portions of the conventional one-dimensional light control films such as, for example, the films disclosed in U.S. Pat. No. 8,213,082 (Gaides et al) at desired wavelengths. In some embodiments, the absorptive portions can have a transmittance of, for example, 10% or lower, 5% or lower, or 2% or lower, in the visible light spectrum.

Figure 1:
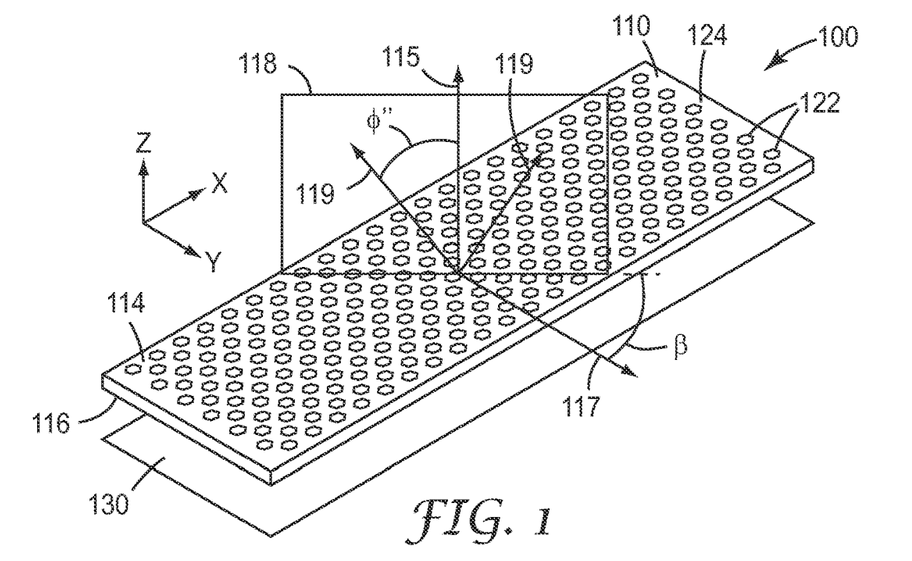
FIG. 1 shows a top perspective exploded view of a light control film, according to one embodiment.

FIG. 1 shows a top perspective exploded view of a light control film (LCF) 100, according to one aspect of the present disclosure. The LCF 100 includes a microstructured layer 110 with a first major surface 114 and an opposing second major surface 116. A view axis 115 is generally perpendicular to at least one of the first major surface 114 and the second major surface 116. The microstructured layer 110 includes an array of posts 122 including a light transmissive material and absorptive regions 124 including an optically absorptive material disposed between the posts 122. The posts 122 are arranged in two dimensions with columns and rows, and longitudinally extend along the view axis 115 between the first major surface 114 and the second major surface 116. The light transmissive material of the posts 122 (or optically transparent region transmitting light) allows the propagation of light at desired wavelengths therethrough. The optically absorptive material of the absorptive regions 124 (or optically opaque regions not transmitting light) prevents the propagation of light at desired wavelengths therethrough. The posts 122 can be optically-isolated by the absorptive regions 124 that optically separate the adjacent posts 122.

In some embodiments, the light transmissive material of the posts 122 can have a transmittance of, for example, 90% or higher, 95% or higher, or 98% or higher, in the visible light spectrum. In some embodiments, the optically absorptive material of the absorptive regions 124 can have a transmittance of, for example, 10% or lower, 5% or lower, or 2% or lower, in the visible light spectrum.

In the embodiment shown in FIG. 1, each of the posts 122 has a cross sectional shape of hexagon in a lateral plane generally perpendicular to the view axis 115. It is to be understood that in some embodiments, the array of posts 122 each can include a cross-section that can be circular shaped, oval shaped, or polygon shaped. In some embodiments, at least one of the posts 122 can have an irregular cross sectional shape. In some embodiments, the array of posts 122 can include a first post having a first cross sectional shape and the a second post having a second cross sectional shape that is different from the first cross sectional shape. In some embodiments, the cross sectional shapes of the array of posts 122 can be a mixture of two or more polygons.

Figure 7:
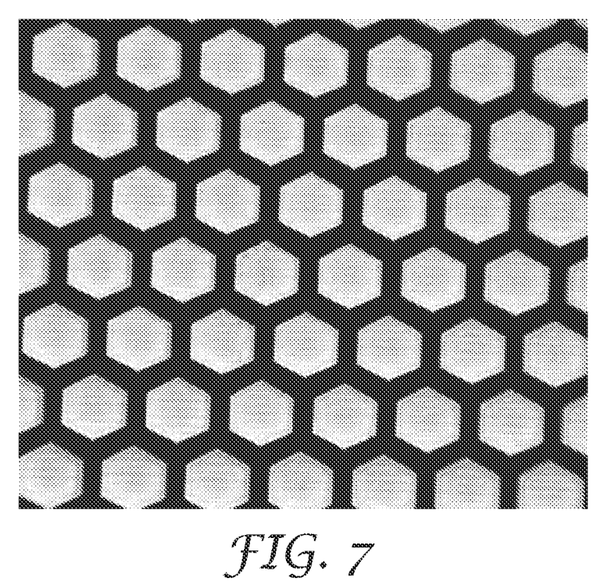
FIG. 7 is a top plan view of a light control film, according to Sample 1 in this disclosure.
Figure 8:
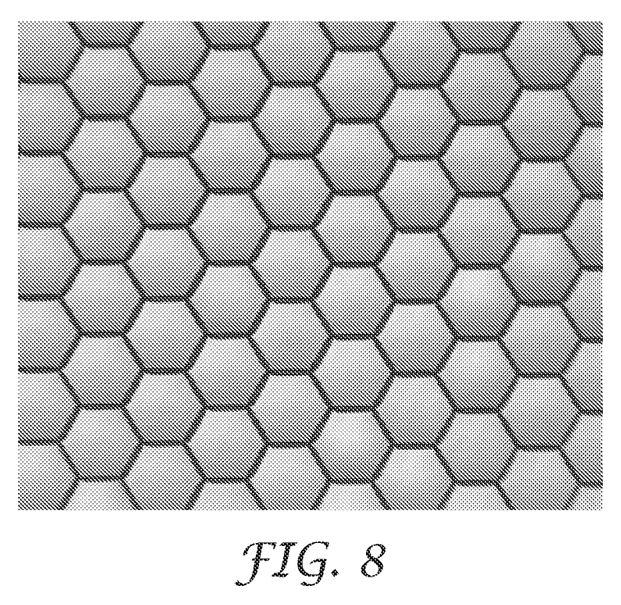
FIG. 8 is a bottom plan view of the light control film of FIG. 7.

In some embodiments, the hexagons of the posts 122 can be arranged in a close packed layout and the absorptive regions 124 therebetween can form a honeycomb pattern (see, for example, FIGS. 4, 7 and 8 to be discussed further below). The posts 122 can be arranged so that the honeycomb pattern of the absorptive regions 124 can have a generally uniform wall thickness in the respective lateral planes. In some embodiments, the array of posts 122 can be positioned non-periodically. The array of posts 122 can be randomly arranged such that the formed pattern in a lateral plan is non-periodic.

In one particular embodiment, the posts 122 have a tapered shape where the cross-section of the posts 122 can decrease in size in the direction from the first major surface 114 to the second major surface 116, as described elsewhere.

The LCF 100 further includes an optically transparent carrier layer 130 coupled to the second major surface 116 of the microstructured layer 110. In some embodiments, the carrier layer 130 can be a flexible base substrate layer including light transmissive polymeric material(s) such as, for example, polycarbonate film(s). In some embodiments, the LCF 100 can further include an optional cover film that covers the microstructured layer 110 at the first major surface 114. The optional cover film can include the same material as, or different than, the carrier layer 130 and can be bonded to the microstructured layer 110 with a bonding agent such as, for example, an adhesive. It is to be understood that in some embodiments, the carrier layer 130 can be disposed at the first major surface 114 and the optional cover film can be disposed at the second major surface 116.

FIG. 1 further shows a set of coordinate axes X, Y and Z to illustrate that the posts 122 are optically isolated such that light can be substantially transmitted longitudinally within the posts 122 and exit the LCF 100 in a direction that is predominantly oriented along the Z axis or the view axis 115. Light may not be substantially transmitted transversely within the lateral plane formed by the X-Y axes.

In one particular embodiment, a viewing plane 118 is shown to be positioned at an azimuthal angle β from the Y-Z plane (defined by the view axis 115 and the line 117 generally parallel to the Y-axis). The viewing plane 118 includes the view axis 115 generally parallel to the Z-axis, and extends generally perpendicular to the X-Y plane. The viewing plane 118 further includes viewing cutoff lines 119 located at a viewing or transmission cutoff angle ϕ" measured from the view axis 115, such that for any angle greater than the viewing cutoff angle ϕ", light may not be substantially transmitted through the LCF 100. The magnitude of the viewing cutoff angle ϕ" can vary, depending on the azimuthal angle and the geometry of the posts 122, as described elsewhere. In some embodiments, the viewing cutoff angle ϕ" can vary, for example, from about 10 degrees to about 70 degrees. In some embodiments, the viewing cutoff angle ϕ" can be about 45° or less. In some embodiments, the viewing cutoff angle ϕ" can be about 30° or less. In some embodiments, the viewing cutoff angle ϕ" can vary according to the cross sectional shape of the posts 122 in the X-Y plane, when the azimuthal angle varies from 0 to 360 degrees. In some embodiments, the viewing cutoff angle ϕ" can vary between 30° to 45° as the azimuthal angle varies from 0 to 360 degrees.

Figure 2:
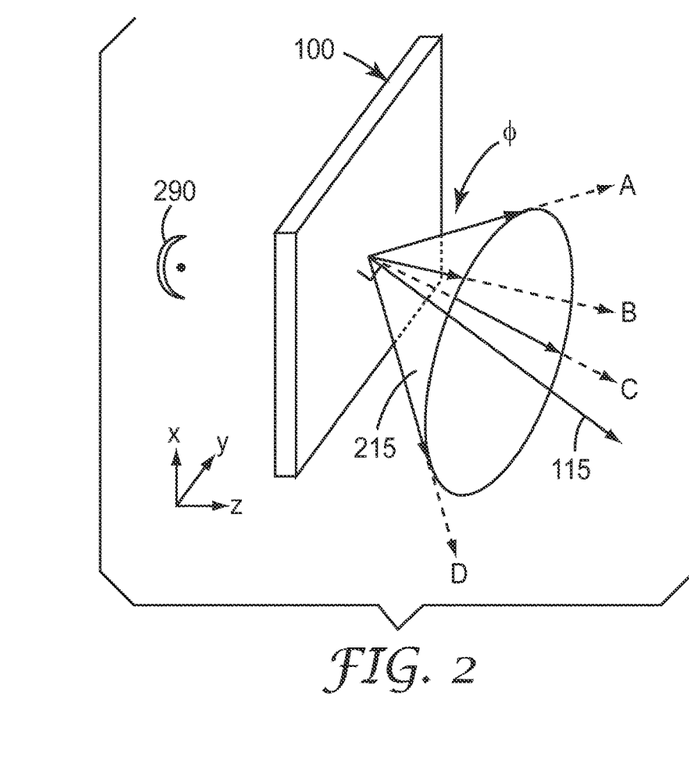
FIG. 2 shows a perspective schematic of the light control film of FIG. 1.

FIG. 2 shows a perspective schematic of the light control film (LCF) 100 that is disposed between a light source 290 and a viewer A, B, C, or D. Light transmitted out of the LCF 100 is confined with a 360° view cone 215 that is around the view axis 115 and defined by the viewing cutoff angle ϕ. The viewers A, B, C, D are located at various positions around the view axis 115 (such as left-right, up-down, and around a 360 degree circle surrounding the view axis 115). As such, the LCF 100 prevents light rays from the light source 290 that are outside the viewing cutoff angle ϕ or the 360° view cone 215 from reaching the viewers A, B, C and D.

Figure 3:
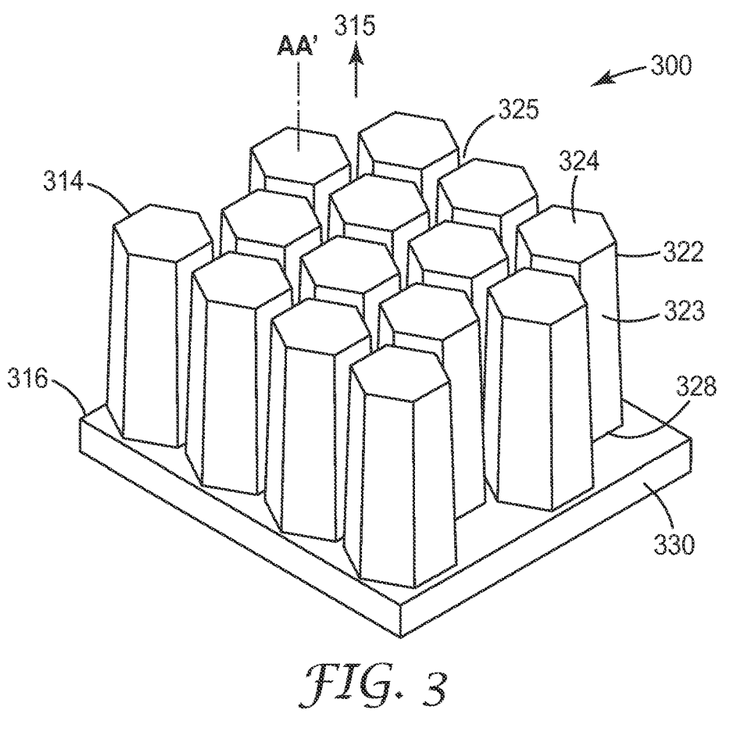
FIG. 3 is a perspective view of a light control film showing an array of posts, according to one embodiment.

FIG. 3 is a perspective view of a light control film 300 showing an array of posts 322, according to one embodiment. FIG. 4 is a top plan view of the light control film 300. The array of posts 322 can be the array of posts 122 of FIG. 1 that includes a light transmissive material. The array of posts 322 are supported by an optically transparent carrier layer 330 which can be, for example, the carrier layer 130 of FIG. 1. The posts 322 are arranged in two dimensions with columns and rows with gaps 325 disposed therebetween. The gaps 325 can be filled with an optically absorptive material to form absorptive regions such as, for example, the absorptive regions 340 shown in FIG. 5 to be discussed further below. After the formation of the absorptive regions between the posts 322, the light control film 300 has a first major surface 314 and a second major surface 316 opposite to the first major surface 314. The posts 322 extend between the first major surface 314 and the second major surface 316 along respective longitudinal axes AA'.

A view axis 315 is generally perpendicular to at least one of the first and second major surfaces 314 and 316. The posts 322 each have a tapered shape along the respective longitudinal axes AA' to form sloped side surfaces 323. The cross-section of the posts 322 in a lateral plane generally perpendicular to the view axis 315 decreases in size in the direction from the second major surface 316 to the first major surface 314. Each post 322 includes a first end 324 adjacent the first major surface 314 and a second end 328 adjacent the second major surface 316. The second ends 328 are supported by the optically transparent carrier layer 330.

Optionally, the carrier layer 330 can include a bonding layer such as, for example, an adhesive layer that includes a bonding agent (e.g., an adhesive) and is capable of coupling the LCF 300 to a variety of substrates that can serve at least one of variety of functions, as described elsewhere. In some embodiments, the bonding agents can be disposed at a major surface, and/or edge(s) of the carrier layer 330.

Figure 4:
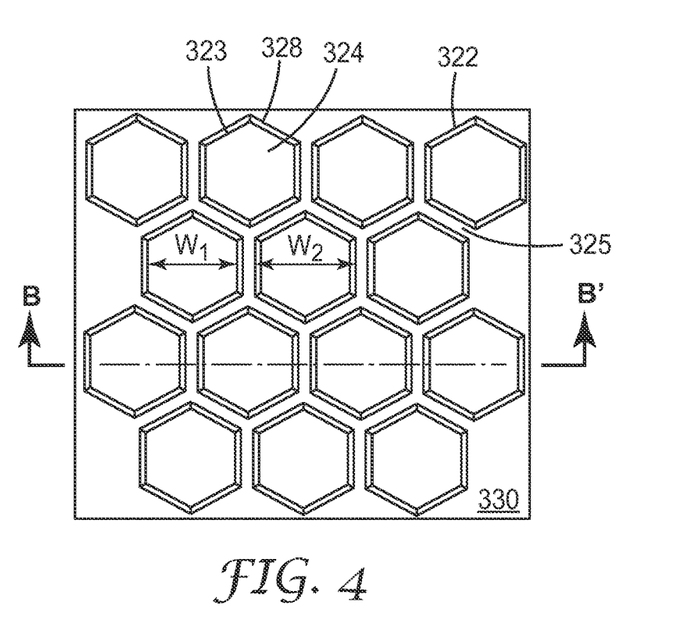
FIG. 4 is a top view of the light control film of FIG. 3.

In the embodiment shown in FIGS. 3 and 4, each post 322 has a cross-sectional shape of hexagon in the lateral plane. The array of posts 322 are arranged in a close packed layout with the gaps 325 (and thereafter filled absorptive regions 340 of FIG. 5) therebetween forming a honeycomb pattern as shown in FIG. 4. The spacing of the gaps 325 can be generally uniform in a lateral plane, and decrease in size in the direction from the first major surface 314 to the second major surface 316.

Figure 5:
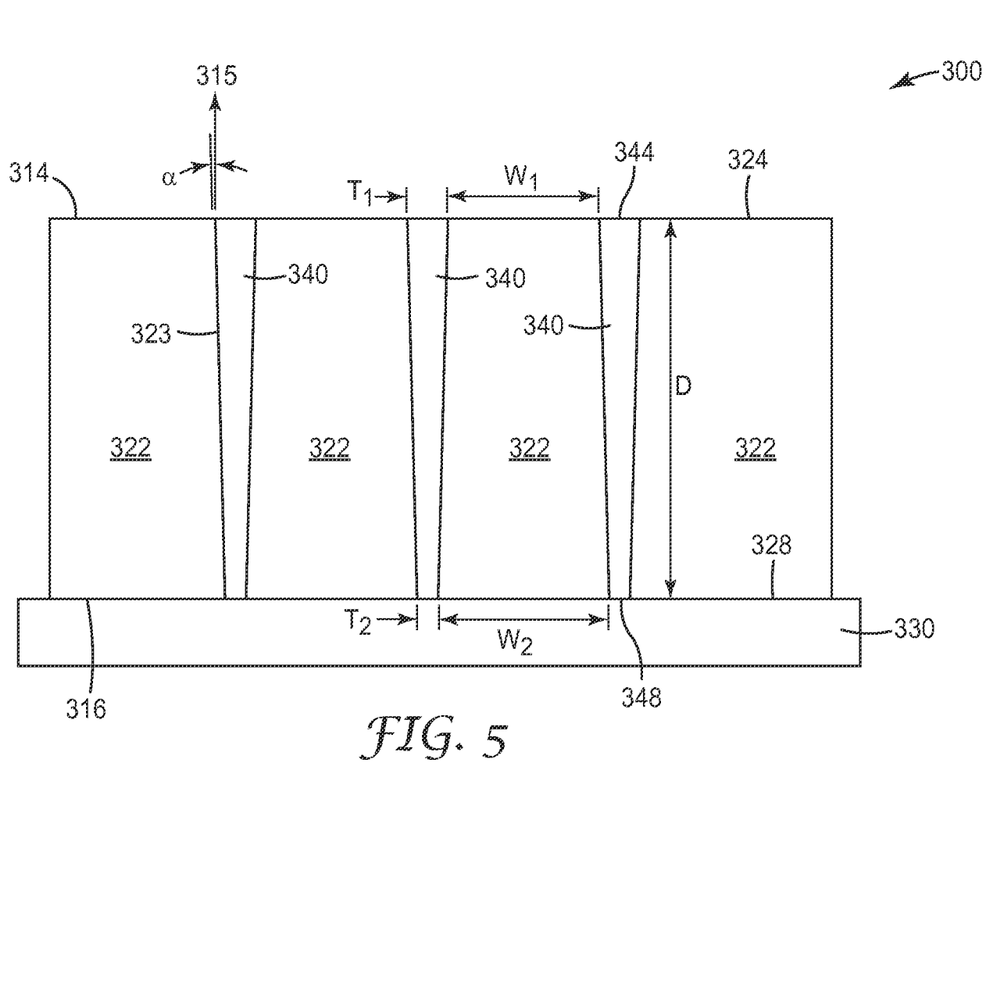
FIG. 5 is a cross-sectional view of the light control film of FIG. 3 showing absorptive regions between the posts.

As shown in FIG. 5, the gaps 325 can be filled with optically absorptive material(s) to form the absorptive regions 340. The absorptive regions 340 can be, for example, the absorptive regions 124 of FIG. 1 that include an optically absorptive material. The absorptive regions 340 form a honeycomb pattern in the lateral plane generally perpendicular to the view axis 315. The array of posts 322 can be arranged so that the filled absorptive regions 340 can have a generally uniform wall thickness in the respective lateral planes. The absorptive regions 340 have a first end surface 344 adjacent the first major surface 314 and a second end surface 348 adjacent the second major surface 316.

The close packed layout of the array of posts 322 can maximize the ratio of light transmissive area over light absorptive area, thereby increasing light transmittance of the LCF 300. In some embodiments, the LCF 300 can have a normalized light transmittance of 50% or more. In some embodiments, the LCF 300 can have a normalized light transmittance of 63% or more. In some embodiments, the LCF 300 can have a normalized light transmittance of 70% or more. In addition, the opposite side surfaces 323 of adjacent posts 322 define laterally uniform spacing or gaps 325 into which optically absorptive material(s) can be uniformly filled to form the absorptive regions 340. The gaps 325 between the posts 322 can provide fluid channels through which a polymerizable composition containing optically absorptive material(s) can flow to uniformly distribute the optically absorptive material(s).

The posts 322 are separated with the absorptive regions 340 therebetween. As is appreciated by those skilled in the relevant art, the spacing between adjacent posts 322 can be determined by calculating the distance between centers, and consideration of the pixel size and spacing in a display. Varying the spacing between the posts 322 can result in the formation of arrays of posts having a high density, medium density or lower density. The posts 322 may be spaced any suitable distance apart. Spacing is determined by measuring the distance between the center points of two adjacent posts. The posts 322 can be generally spaced between 10 micrometers and 500 micrometers apart. In some embodiments, the posts 322 may be spaced about 20 micrometers to about 400 micrometers apart. In some embodiments, the posts 322 may be spaced about 30 micrometers to about 300 micrometers apart. In some embodiments, the posts 322 may be spaced about 50 micrometers to about 200 micrometers apart.

FIG. 5 is a cross-sectional view of the light control film 300 along a lateral axis BB' of FIG. 4. The posts 322 each have a tapered shape with a draft angle α formed between the side surfaces 323 thereof and the view axis 315. The draft angle α can affect light transmittance through the LCF 300. For example, relatively large draft angles, such as greater than 10 degrees, can increase the width of the absorptive regions 340, thereby decreasing transmission at normal incidence. In some embodiments, the draft angle α can be about 5° or less. In some embodiments, the draft angle α can be about 3° or less. In some embodiments, the draft angle α can be between 0.5° to 3°.

The posts 322 have a depth "D" which is a longitudinal distance between the first end 324 to the send end 328 of the respective posts 322. The first and second ends 324 and 328 have a first end width "$W_1$" and a second end width "$W_2$", respectively. The first width "$W_1$" and the second end width "$W_2$" are representative lateral dimensions of the cross sections of the posts 322 in the respective lateral planes. The honeycomb pattern of the absorptive regions 340 has a first wall thickness "$T_1$" at the first end surface 344 adjacent the first major surface 314 and a second wall thickness "$T_2$" at the second end surface 348 adjacent the second major surface 316. The first wall thickness "$T_1$" and second wall thickness "$T_2$" are representative lateral dimensions of the cross sections of the absorptive regions 340 in the respective lateral planes. In the embodiment shown in FIGS. 3-5, the posts 322 each have a tapered shape so that $W_2$ is greater than $W_1$ and $T_1$ is greater than $T_2$.

An aspect ratio of the posts 322 can be defined as a ratio between an average longitudinal dimension along the longitudinal axis AA' and an average lateral dimension along the lateral axis BB'. As shown in the embodiment of FIG. 5, the posts 322 have an aspect ratio that can be defined by $D/((W_1+W_2)/2)$. It is to be understood that in some embodiments, the posts 322 can have a cross-sectional shape of polygon other than hexagon or other regular or irregular shapes, and the aspect ratio can be defined in a similar manner. The aspect ratio of the posts 322 can generally determine the effective viewing angle in a direction governed by the aspect ratio. In some embodiments, the aspect ratio $D/((W_1+W_2)/2)$ can be 2 or more, and the corresponding effective viewing angle can be 60 degrees or less. In some embodiments, the aspect ratio $D/((W_1+W_2)/2)$ can be 8 or less, and the corresponding effective viewing angle can be 10 degrees or more. In some embodiments, the aspect ratio $D/((W_1+W_2)/2)$ can be between 2 and 8, and the corresponding effective viewing angle can be between 60 degrees and 10 degrees. In some embodiments, the appropriate aspect ratio $D/((W_1+W_2)/2)$ can be determined so that the effective viewing angle is about 45 degrees or less. In some embodiments, the appropriate aspect ratio $D/((W_1+W_2)/2)$ can be determined so that the effective viewing angle is about 30 degrees or less.

A ratio of the lateral dimensions between the posts 322 and the absorptive regions 340 can be defined by the ratio between the average lateral dimensions in the respective cross sections thereof. As shown in the embodiment of FIG. 4 or 5, the posts 322 have a cross-sectional shape of hexagon and the absorptive regions 340 form a honeycomb pattern where the ratio of the lateral dimensions can be defined by $(W_1+W_2)/(T_1+T_2)$. In some embodiments, the ratio $(W_1+W_2)/(T_1+T_2)$ can be between 2 and 30. Light transmittance through the LCF 300 can be increased by increasing the ratio of the lateral dimensions between the posts 322 and the absorptive regions 340. In some embodiments, the ratio $(W_1+W_2)/(T_1+T_2)$ can be no less than 5. In some embodiments, the ratio $(W_1+W_2)/(T_1+T_2)$ can be no less than 10. In some embodiments, the ratio $(W_1+W_2)/(T_1+T_2)$ can be no less than 20.

A ratio of the lateral areas between the posts 322 and the absorptive regions 340 can be defined by a ratio between the lateral areas in the respective cross sections. Light transmittance through the LCF 300 can be increased by increasing the ratio of the lateral areas between the posts 322 and the absorptive regions 340. In some embodiments, the area ratio of the posts 322 and the absorptive regions 340 can be 3:2 or more at the cross section adjacent the first major surface 314 and 4:1 or more at the cross section adjacent the second major surface 316. In some embodiments, the average lateral area ratio of the posts 322 and the absorptive regions 340 can be 2:1 or more, 5:2 or more, or 5:1 or more.

In some embodiments, the posts 322 can have the depth "D" of 10 micrometers to one mm. The cross sectional hexagons adjacent the first major surface 314 can have the first width "$W_1$" of 1 to 200 micrometers. The cross sectional hexagons adjacent the second major surface 316 can have the second width "$W_2$" of 2 to 250 micrometers. The honeycomb pattern of the absorptive regions 340 can have the wall thickness "$T_1$" of 0.2 to 40 micrometers adjacent the first major surface 314. The honey comb pattern of the absorptive regions 340 can have the wall thickness "$T_2$" of about 0 to 20 micrometers adjacent the second major surface 316.

In some embodiments, the posts 322 can have the depth "D" of 15 to 1000 micrometers. The cross sectional hexagons adjacent the first major surface 314 can have the first width "$W_1$" of 10 to 100 micrometers. The cross sectional hexagons adjacent the second major surface 316 can have the second width "$W_2$" of 20 to 120 micrometers. The honeycomb pattern of the absorptive regions 340 can have the wall thickness "$T_1$" of 2 to 40 micrometers adjacent the first major surface 314. The honey comb pattern of the absorptive regions 340 can have the wall thickness "$T_2$" of about 0 to 20 micrometers adjacent the second major surface 316.

The array of posts 322 includes an optically transparent material such as, for example, a transparent polymeric material. In some embodiments, the transparent polymeric material includes at least one of polyurethane, acrylate, and polycarbonate.

In some embodiments, the array of posts 322 can be prepared by molding and curing a polymerizable resin. The polymerizable resin can include a combination of first and second polymerizable components selected from, for example, (meth)acrylate monomers, (meth)acrylate oligomers, and mixtures thereof. As used herein, "monomer" or "oligomer" is any substance that can be converted into a polymer. The term "(meth)acrylate" refers to both acrylate and methacrylate compounds. In some cases, the polymerizable composition can include a (meth)acrylated urethane oligomer, (meth)acrylated epoxy oligomer, (meth)acrylated polyester oligomer, a (meth)acrylated phenolic oligomer, a (meth)acrylated acrylic oligomer, and mixtures thereof. The polymerizable resin can be a radiation curable polymeric resin, such as a ultraviolet (UV) curable resin. In some cases, polymerizable resin compositions useful for the LCF of the present description can include polymerizable resin compositions such as are described in U.S. Publication No. 2007/0160811 (Gaides et al).

The absorptive regions 340 include an optically absorptive material that can be any suitable material that functions to absorb or block light at least in a portion of the visible spectrum. In some embodiments, the optically absorptive material can be coated or otherwise provided in the gaps 325 between the posts 322 to form the absorptive regions 340. In some embodiments, the optically absorptive material can include a black colorant, such as carbon black. The carbon black may be a particulate carbon black having a particle size less than 10 microns, for example 1 micron or less. The carbon black may, in some embodiments, have a mean particle size of less than 1 micron. In some embodiments, the absorptive material (e.g., carbon black, another pigment or dye, or combinations thereof) can be embedded within a resin that can be cured by, for example, radiation or heating, to form a radiation cured resin or a thermally cured resin. In yet further embodiments, the absorptive material can be dispersed in a suitable binder. In some embodiments, the absorptive regions 340 can include, for example, 0.1% to 3% by weight of black colorant such as carbon black. The optically absorptive material may also include particles or other scattering elements that can function to block light from being transmitted through the absorptive regions 340.

Figure 6:
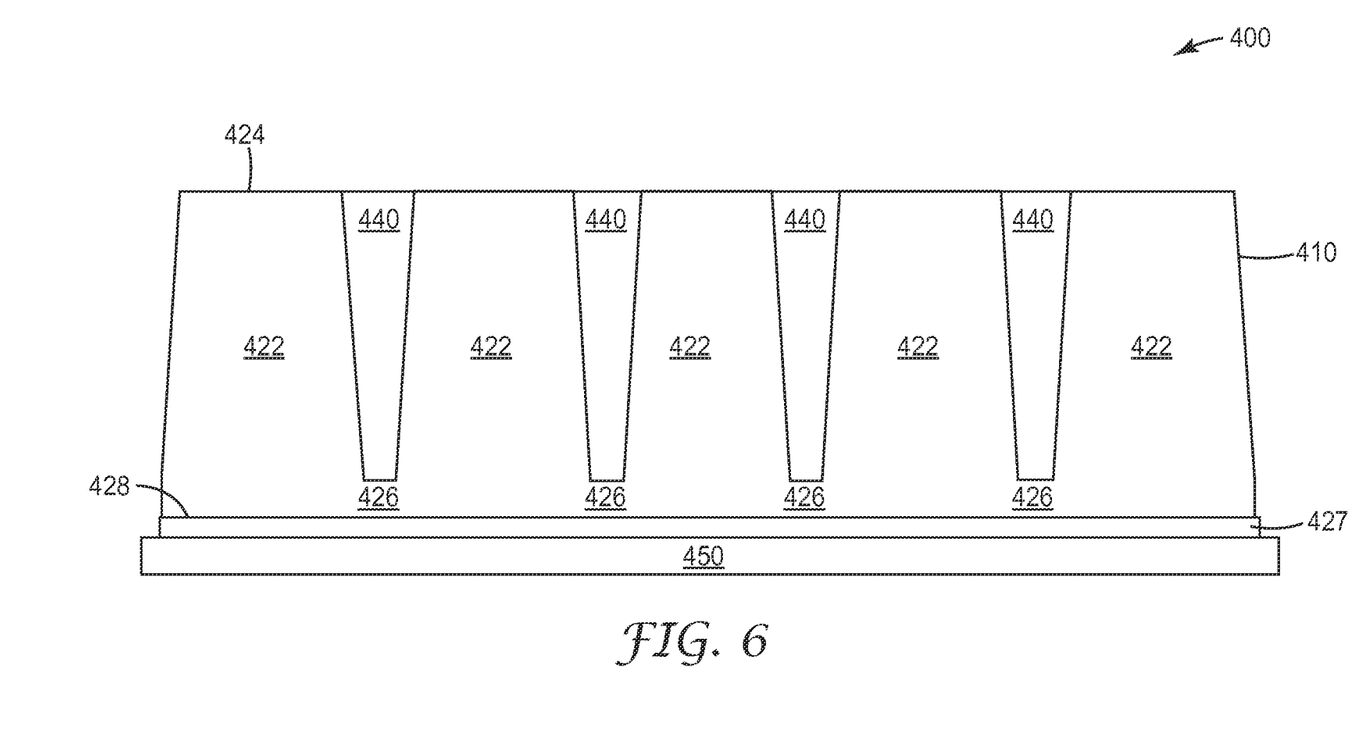
FIG. 6 is a cross-sectional view of a light control film, according to another embodiment.

FIG. 6 shows a cross-sectional view of an LCF 400, according to another embodiment. Similar to the LCF 300 of FIG. 5, the LCF 400 includes a microstructured layer 410 including an array of posts 422 including a light transmissive material and absorptive regions 440 disposed between the posts 422 to form a microstructured layer 410. The posts 422 each extends longitudinally between a first end 424 and a second end 428. The posts 422 are connected, via land regions 426, at the second ends 428. The land regions 426 include a light transmissive material that can be the same material as, or different than, the posts 422.

Optionally, the LCF 400 can include a bonding layer such as, for example, an adhesive layer 427. In some embodiments, the adhesive layer 427 can be incorporated into the LCF 400 by coating a bonding agent (e.g., an adhesive) onto the second ends 428 of the posts 422. In some embodiments, the adhesive layer 427 can be transferred to the LCF 400 by transferring the adhesive layer 427 from a carrier to the microstructured layer 410 via lamination processes that are known in the art. The adhesive layer 427 can substantially permit the transmission of light (for example, ultraviolet and/or visible wavelengths of light).

The optional adhesive layer 427 can couple the LCF 400 to a substrate 450. In some embodiments, the substrate 450 can be a flexible carrier (for example, paper, coated paper, polymeric film, metal film) that functions to carry the microstructured layer 410 or the materials that form the microstructured layer 410 during a processing step. In some embodiments, the substrate 450 can be a rigid or a flexible material (for example, architectural glazing, a glass slide, a plastic film, coated paper, and the like) and can function as a protective layer to retain functional properties (for example, structure, shape, size, chemical integrity, optical properties, and/or adhesion properties) associated with the article. In some embodiments, the substrate 450 may be a component of an imaging system (for example, a liquid crystal display, a camera, a lens, a fiber optic bundle) or other information-carrying device. In some embodiments, the substrate 450 can be a display such as a liquid crystal display, organic light emitting diode display, plasma display, electrophoretic display, printed image, and the like, or a window such as architectural glazing. In some embodiments, the adhesive layer 427 can disposed at the first ends 424 of the posts 422 to couple the LCF 400 to another substrate.

The substrate 450 can be a flexible component that can be used for a variety of purposes. Non-limiting examples of flexible substrates include polymer films, metal films, or paper. In some embodiments, the substrate 450 is a carrier (for example, a release liner) that is coated with adhesive layer 427 in order to transfer the adhesive layer 427 to the microstructured layer 410. Preferably, in these and other embodiments, the substrate 450 can be coated with a release chemistry such as a silicone, fluorosilicone, wax, or other low surface energy material to facilitate release of the adhesive layer 427 from the substrate 450. Flexible substrates can be used for processing, carrying, and/or protecting the LCF 400 from damage or contamination.

The substrate 450 can be a rigid structural component (for example, a display surface, architectural glazing, a camera, a fiber optic faceplate, a microscope slide, a mirror) that causes an LCF to be inflexible or to retain structural memory. By coupling the LCF to a rigid substrate, the article can retain a shape that is optically interrogatable. The step of coupling the LCF to a rigid substrate is carried out by contacting the LCF directly to the substrate or by coating either the LCF and/or the rigid substrate with a bonding agent and then contacting the LCF/bonding agent to the substrate or substrate/bonding agent to the LCF. The result of the coupling step will be to cause the LCF to be attached to a rigid substrate.

A bonding agent useful in the adhering step of the method of the disclosure can be any substance that is capable of securing the attachment of the LCF to the substrate without adverse degradation of the substrate or the LCF. As will be appreciated by one skilled in the art, when the article is coated with the bonding agent, the back surface of the LCF will be coated; that is, the surface coated with the bonding agent is the surface of the LCF not containing the formed features such as cavities. Suitable bonding agents include, but are not limited to, liquid epoxies; glues or adhesives. Preferably, a pressure sensitive adhesive is used.

A rigid substrate can be formed from any of a variety of materials and will be selected according to the desired properties of the rigid substrate, including, but not limited to the above-discussed structural properties and other structural properties such as flatness, strength, stiffness, thickness, low thermal expansion coefficient, optical properties and chemical properties such as microstructured layer compatibility. For example, a rigid structure can be selected to have optical properties that include, but are not limited to being transparent, selectively transparent, having a selected refractive index, absorptive, selectively absorptive, opaque or reflective. In addition, a metal or metal-coated rigid structure can be employed. Compositions for a rigid substrate include metals, such as aluminum, iron, steel, various alloys, and the like; ceramics; composites such as fiberglass; silicon or other semiconductor materials; glass; rigid plastics or polymers; and the like.

The LCFs described herein can be prepared by a method including steps of, for example, (i) preparing a polymerizable composition; (ii) depositing the polymerizable composition onto a master negative microstructured molding surface having, for example, hexagonal pockets which are negative replica of an array of posts (e.g., 122 of FIG. 1, 322 of FIG. 3, or 422 of FIG. 6); (iii) curing the composition to create the array of posts; and (iv) filling the gaps between the posts with an absorptive material-containing resin to form absorptive regions (e.g., 124 of FIG. 1, 340 of FIG. 5, or 440 of FIG. 6).

EXAMPLES

Sample 1: A multiphoton lithographic process was used to build a master tool including an array of hexagonal posts each having a draft degree of 2 to 3 degrees, a longitudinal depth of 300 micrometers and a lateral width of 75 micrometers per side. The spacing or gap between adjacent posts is 15 micrometers at one end and 30 micrometers at the other end. An exemplary multiphoton lithographic process is described in U.S. Pat. No. 8,605,256 (DeVoe et al). Alternatively, the master tool can be made by a deep silicon etching process. An exemplary deep silicon etching process is described in U.S. Pat. No. 5,501,893 (Laermer et al). A master negative microstructured mold having hexagonal pockets was then made by using VT-330 two part silicone (commercially available from Freeman Manufacturing & Supply Co.) to cast from the master tool. The silicone pockets were cast with WC-780 two part water clear urethane resin (commercially available from BJB Enterprises) and cured under pressure at 60 psi and 60° C. to create a polyurethane replica of the original master.

The gaps between the water clear polyurethane hexagonal posts were then filled with an absorptive material-containing resin. The absorptive material-containing resin mixture contains 67% by weight Photomer 6210 (an aliphatic urethane diacrylate commercially available from IGM Resins, Waalwijk, The Netherlands), 20% by weight 9B385 (a carbon black UV curable paste commercially available from Penn Color, Doylestown Pa.), and 10% by weight SR285 (tetrahyrofurfuryl acrylate commercially available from Sartomer, Exton, Pa.). The absorptive material-containing resin also contained 1% each of Irgaucre 369, Irgacure 819, and Darocur 1173, each of which are photoinitiators commercially available from BASF, Charlette, N.C. Excess absorptive-material resin was wiped from the surfaces of the transparent posts. The black containing resin was cured with UV radiation (1 pass, 25 feet per minute, one-side exposure with one Fusion D bulb operating at 236 W/cm). A 175 micrometers thick gloss/gloss polycarbonate film was laminated over the filled post structure using a radiation curable adhesive mixture containing 70% by weight SR339 (phenoxyethyl acrylate available from Sartomer, Exton, Pa.), 10% by weight Vitel 3350B (commercially available from Bostik, Wauwatosa, Wis.), 10% by weight E20071 (commercially available from Sartomer, Exton, Pa.), 10% by weight of isobornyl acrylate (commercially available from Sartomer, Exton, Pa.), 1% by weight Irgacure TPO (commercially available from BASF, Charlette, N.C.), 1% by weight Tinuvin 928 (commercially available from BASF, Charlette, N.C.) and 0.25% by weight Tinuvin 123 (commercially available from BASF, Charlette, N.C.). The adhesive mixture was cured with UV radiation (1 pass, 25 feet per minute, one-side exposure with one Fusion D bulb operating at 236 W/cm).

The formed light control film includes an array of hexagonal posts and absorptive regions disposed between the posts. The formed light control film and has a configuration similar to the LCF 100, 300 or 400 shown in FIGS. 1-6. FIGS. 7 and 8 show the top and bottom plan view of the formed light control film.

The light transmission of several LCFs as a function of viewing angle was measured using an Autronic Conostage3 Conoscope (Autronic-Melchers GmnH, Karlsruhe, Germany) The LCFs were placed on top of a diffusely transmissive light source in the stage of the conoscope. The luminance (cd/m², or "nits", that is, brightness) profiles of the light source with the LCFs was measured. An Autronic Conostage3 Conoscope (commercially available from Autronic-Melchers GmnH, Karlsruhe, Germany) was used to measure the luminance (brightness) profiles of the diffuse light source both with an LCF and with a clear glass microscope slide (2957F, commercially available from Swiss Glass). The optical performance of the LCF was normalized by dividing the luminance of the LCF on the diffuse light source by the luminance of the clear glass slide on the diffuse light source.

Figure 9A:
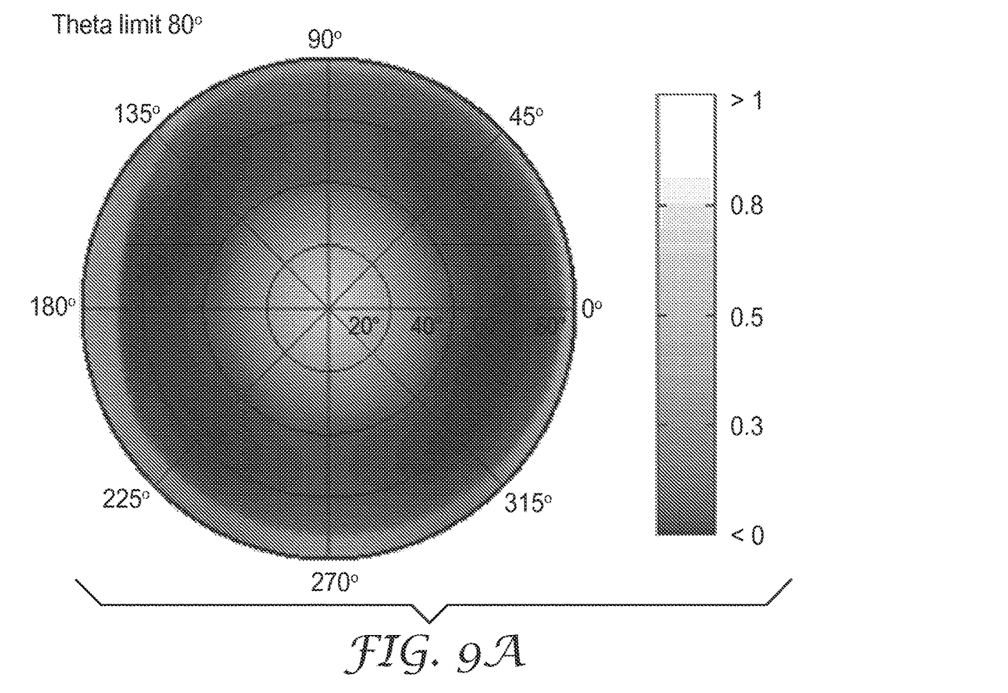
FIG. 9A shows normalized light transmittance of light control films, according to Sample 1 in this disclosure.
Figure 9B:
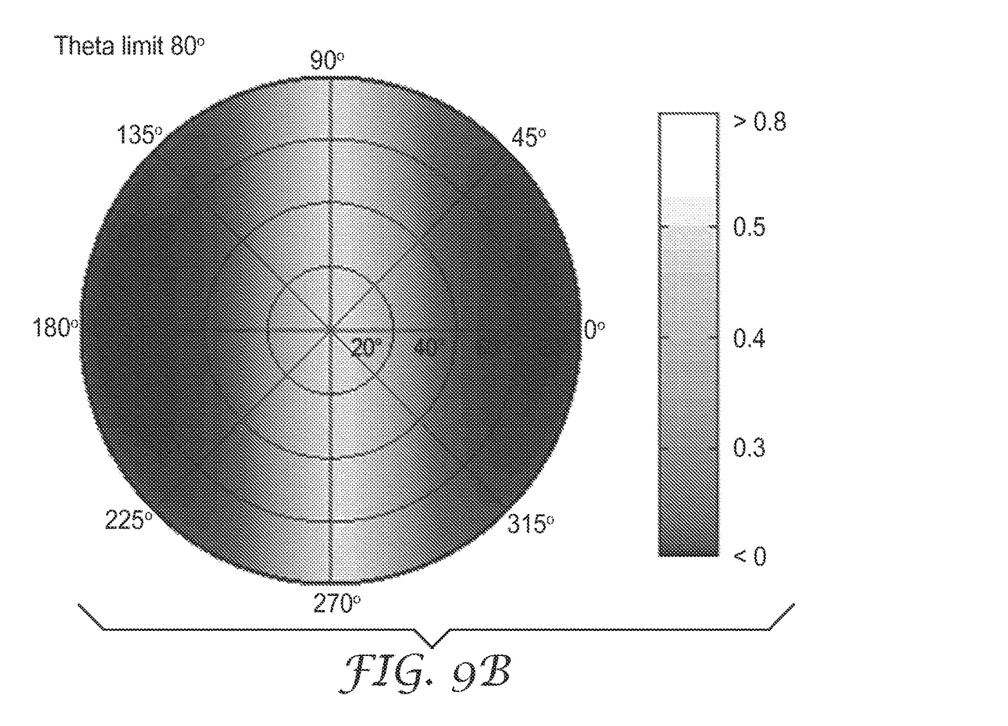
FIG. 9B shows normalized light transmittance of a one-dimensional light control film.
Figure 10A:
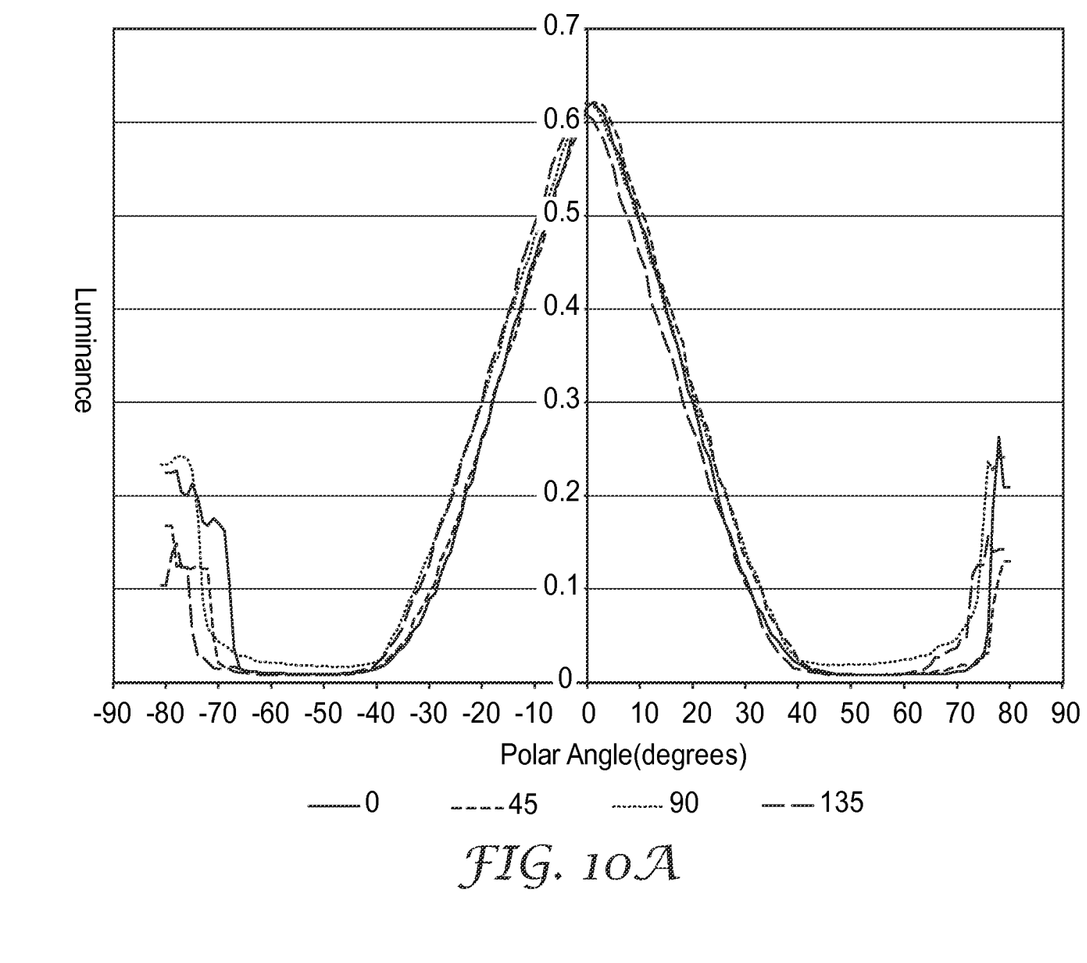
FIG. 10A shows plots of luminescence versus viewing angle for the light control film of FIG. 9A.
Figure 10B:
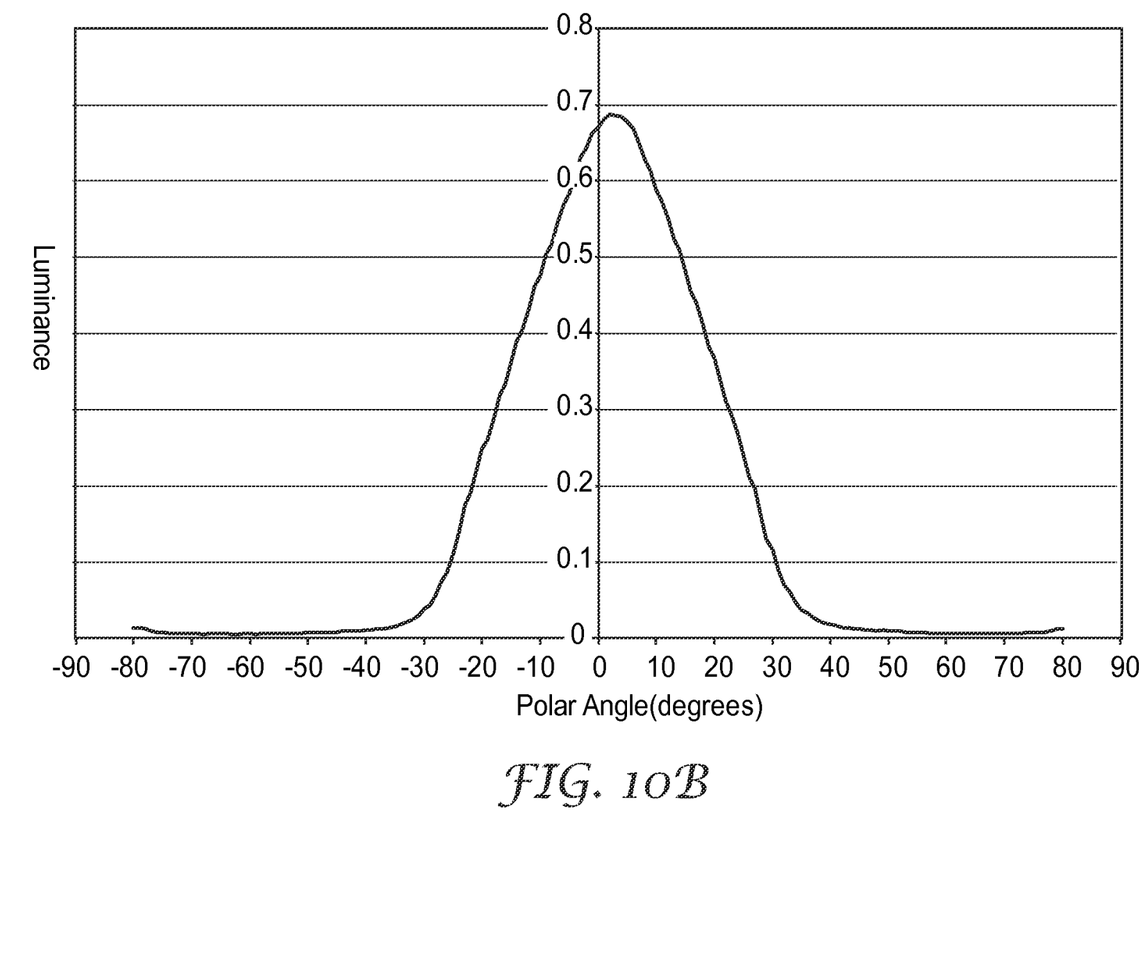
FIG. 10B is shows plots of luminescence versus viewing angle for the one-dimensional light control film of FIG. 9B.

The measured optical performance data for the light control films of Sample 1 are shown in FIGS. 9A and 10A. As a comparison, a one-dimensional light control film similar to the films described in U.S. Pat. No. 8,213,082 (Gaides et al.) was also measured. The one-dimensional light control film has a series of evenly spaced channels in a cured resin. Each of the channels has a nominally trapezoidal cross-section. The cured resin channels were about 24 micrometers wide (at their narrowest), about 74 micrometers deep, and spaced at about a 32 micrometers pitch. The included wall angle was about 3.6°. The light transmissive material and absorptive material of the one-dimensional light control film have similar light transmittance as compared to that in Sample 1. The measured optical performance data for the one-dimensional light control film are shown in FIGS. 9B and 10B.

FIG. 10A shows four curves of the normalized luminance versus viewing angle or polar angle at four specified azimuthal angles (e.g., 0°, 45°, 90°, and 135°). FIG. 10B shows the normalized luminance versus viewing angle or polar angle at 0 degree azimuthal angle.

The light control films of FIGS. 9A and 10A in this disclosure provide a 360° view cone and block light outside of this view cone. In addition, the light control films of FIGS. 9A and 10A have a normalized light transmittance comparable to that of the one-dimensional light control film shown in FIGS. 9B and 10B. That is, the light control films in this disclosure can provide security in all directions including, for example, right-and-left and up-and-down of the films, without compromising light transmittance compared to one-dimensional light control films. The high light transmittance exhibited by the LCFs in this disclosure can be primarily attributable to the configurations of the LCFs including, for example, the close packed layout, the high aspect ratio of the posts, the high ratio of the lateral areas between the posts and the absorptive regions, etc.

Listing of Exemplary Embodiments

Embodiment 1 is: A light control film, comprising:
a first major surface and a second major surface opposite the first major surface;
a view axis generally perpendicular to at least one of the first and second major surfaces;
an array of posts comprising a light transmissive material, the array of posts being arranged in two dimensions with columns and rows, and extending along respective longitudinal axes from the first major surface to the second major surface; and
absorptive regions disposed between the array of posts, the absorptive regions comprising an optically absorptive material and extending at least partially from the first major surface to the second major surface,
wherein at least one of the posts has a tapered shape along the respective longitudinal axis, and
wherein the array of posts and the adsorptive regions are arranged to confine light transmitted out of the first or second major surface to be within a 360° view cone around the view axis.

Embodiment 2 is: The light control film of embodiment 1, further comprising an optically transparent carrier layer disposed adjacent at least one of the first and second major surfaces to support respective ends of the array of posts.

Embodiment 3 is: The light control film of embodiment 1, further comprises an adhesive layer configured to couple the light control film to a substrate.

Embodiment 4 is: The light control film of any preceding embodiment, further comprising land regions at the first or second major surface configured to connect respective ends of the array of posts, the land regions comprising the light transmissive material.

Embodiment 5 is: The light control film of any preceding embodiment, wherein the array of posts comprise a transparent polymeric material.

Embodiment 6 is: The light control film of embodiment 5, wherein the transparent polymeric material comprises at least one of polyurethane, acrylate, and polycarbonate.

Embodiment 7 is: The light control film of any preceding embodiment, wherein the optically absorptive material comprises at least one of pigment and dye.

Embodiment 8 is: The light control film of any preceding embodiment, wherein the absorptive regions further comprise a radiation cured resin or a thermally cured resin.

Embodiment 9 is: The light control film of any preceding embodiment, wherein at least one of the posts have a cross sectional shape of polygon.

Embodiment 10 is: The light control film of embodiment 9, wherein the posts each have a cross sectional shape of hexagon, the hexagons are arranged in a close packed layout, and the absorptive regions therebetween form a honeycomb pattern.

Embodiment 11 is: The light control film of embodiment 10, wherein the posts have a depth D along the view axis, the hexagons adjacent the first major surface have a side width $W_1$, the hexagons adjacent the second major surface have a side width $W_2$, the honeycomb pattern of the absorptive regions has a wall thickness $T_1$ adjacent the first major surface, and the honey comb pattern of the absorptive regions has a wall thickness $T_2$ adjacent the second major surface, the ratio $D/(W_1+W_2)/2)$ is between 2 and 8, and the ratio $(W_1+W_2)/(T_1+T_2)$ is between 2 and 30.

Embodiment 12 is: The light control film of embodiment 11, wherein the posts have the depth D of 15 to 1000 micrometers, the hexagons adjacent the first major surface have the side width $W_1$ of 10 to 100 micrometers, the hexagons adjacent the second major surface have the side width $W_2$ of 20 to 120 micrometers, the honeycomb pattern of the absorptive regions has the wall thickness $T_1$ of 2 to 40 micrometers adjacent the first major surface, and the honey comb pattern of the absorptive regions has the wall thickness $T_2$ of about 0 to 20 micrometers adjacent the second major surface.

Embodiment 13 is: The light control film of any preceding embodiment, wherein an area ratio of the array of posts and the absorptive regions adjacent the first major surface is 3:2 or more, and an area ratio of the array of posts and the absorptive regions adjacent the second major surface is 4:1 or more.

Embodiment 14 is: The light control film of any preceding embodiment, wherein at least one of the posts has an irregular cross sectional shape.

Embodiment 15 is: The light control film of any preceding embodiment, wherein the array of posts comprise posts having two or more cross sectional shapes.

Embodiment 16 is: The light control film of any preceding embodiment, wherein the array of posts are positioned non-periodically.

Embodiment 17 is: The light control film of any preceding embodiment, wherein the tapered shape of the at least one of the posts has a draft angle of about 5° or less, and preferably about 3° or less.

Embodiment 18 is: The light control film of embodiment 17, wherein the draft angle is between 0.5° and 3°, and preferably between 1° and 3°.

Embodiment 19 is: The light control film of any preceding embodiment, wherein the 360° view cone has a transmission cutoff angle with respect to the view axis of about 45° or less.

Embodiment 20 is: The light control film of embodiment 19, wherein the transmission cutoff angle is about 30° or less.

Embodiment 21 is: The light control film of any preceding embodiment, wherein within the 360° view cone, a normalized light transmittance is about 50% or more.

Embodiment 22 is: The light control film of embodiment 21, wherein the normalized light transmittance is about 63% or more.

Embodiment 23 is: The light control film of embodiment 22, wherein the normalized light transmittance is about 70% or more.

Embodiment 24 is: A display device comprising the light control film of any preceding embodiment.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, various exemplary embodiments have been described. These and other embodiments are within the scope of the following claims.

What is claimed is:

1. A light control film, comprising:
   a first major surface and a second major surface opposite the first major surface;
   a view axis generally perpendicular to at least one of the first and second major surfaces;
   an array of posts comprising a light transmissive material, the array of posts being arranged in two dimensions with columns and rows, and extending along respective longitudinal axes from the first major surface to the second major surface; and
   absorptive regions comprising a polymerizable composition containing one or more optically absorptive materials continuously disposed between the array of posts, the one or more optically absorptive materials only filling gaps in fluid communication between the posts and extending between a first end surface and a second end surface along the view axis,
   wherein at least one of the posts has a tapered shape along the respective longitudinal axis, and
   wherein the array of posts and the absorptive regions are arranged to confine light transmitted out of the first or second major surface to be within a 360° view cone around the view axis.

2. The light control film of claim 1, further comprising an optically transparent carrier layer disposed adjacent at least one of the first and second major surfaces to support respective ends of the array of posts.

3. The light control film of claim 1, further comprises an adhesive layer configured to couple the light control film to a substrate.

4. The light control film of claim 1, further comprising land regions at the first or second major surface configured to connect respective ends of the array of posts, the land regions comprising the light transmissive material.

5. The light control film of claim 1, wherein the array of posts comprise a transparent polymeric material, optionally the transparent polymeric material comprises at least one of polyurethane, acrylate, and polycarbonate.

6. The light control film of claim 1, wherein the one or more optically absorptive materials comprise at least one of pigment and dye.

7. The light control film of claim 1, wherein the absorptive regions further comprise a radiation cured resin or a thermally cured resin.

8. The light control film of claim 1, wherein at least one of the posts have a cross sectional shape of polygon, optionally, the posts each have a cross sectional shape of hexagon, the hexagons are arranged in a close packed layout, and the absorptive regions therebetween form a honeycomb pattern.

9. The light control film of claim 8, wherein the posts have a depth D along the view axis, the hexagons adjacent the first major surface have a side width $W_1$, the hexagons adjacent the second major surface have a side width $W_2$, the honeycomb pattern of the absorptive regions has a wall thickness $T_1$ adjacent the first major surface, and the honey comb pattern of the absorptive regions has a wall thickness $T_2$ adjacent the second major surface, the ratio $D/((W_1+W_2)/2)$ is between 2 and 8, and the ratio $(W_1+W_2)/(T_1+T_2)$ is between 2 and 30.

10. The light control film of claim 1, wherein an area ratio of the array of posts and the absorptive regions adjacent the first major surface is 3:2 or more, and an area ratio of the array of posts and the absorptive regions adjacent the second major surface is 4:1 or more.

11. The light control film of claim 1, wherein the tapered shape of the at least one of the posts has a draft angle of about 5° or less.

12. The light control film of claim 1, wherein the 360° view cone has a transmission cutoff angle with respect to the view axis of about 45° or less.

13. The light control film of claim 1, wherein within the 360° view cone, a normalized light transmittance is about 50% or more.

14. The light control film of claim 13, wherein the normalized light transmittance is about 63% or more.

15. A display device comprising the light control film of claim 1.

16. A method of making a light control film having a first major surface and a second major surface opposite the first major surface, and a view axis generally perpendicular to at least one of the first and second major surfaces, the method comprising:
    providing an array of posts comprising a light transmissive material, the array of posts being supported by an optically transparent carrier layer, the array of posts being arranged in two dimensions with columns and rows, and extending along respective longitudinal axis from a first major surface to a second major surface; and
    filling gaps between the posts by flowing a polymerizable composition containing one or more optically absorptive materials to continuously dispose between the array of posts to form absorptive regions, the gaps being in fluid communication with each other to provide fluid channels through which the one or more optically absorptive materials can flow around the columns and rows of posts,
    wherein at least one of the posts has a tapered shape along the respective longitudinal axis, and
    wherein the array of posts and the absorptive regions are arranged to confine light transmitted out of the first or second major surface to be within a 360° view cone around the view axis.

17. The method of claim 16, wherein the posts each have a cross sectional shape of hexagon, the hexagons are arranged in a close packed layout, and the absorptive regions therebetween form a honeycomb pattern.

18. The method of claim 17, wherein the posts have a depth D along the view axis, the hexagons adjacent the first major surface have a side width W1, the hexagons adjacent the second major surface have a side width W2, the honeycomb pattern of the absorptive regions has a wall thickness T1 adjacent the first major surface, and the honey comb pattern of the absorptive regions has a wall thickness T2 adjacent the second major surface, the ratio D/((W1+W2)/2) is between 2 and 8, and the ratio (W1+W2)/(T1+T2) is between 2 and 30.

19. The method of claim 16, wherein providing the array of posts comprises (i) preparing a polymerizable composition; (ii) depositing the polymerizable composition onto a master negative micro-structured molding surface having hexagonal pockets which are negative replica of the array of posts; and (iii) curing the polymerizable composition to create the array of posts.

* * * * *